(12) United States Patent
Mantiuk et al.

(10) Patent No.: US 7,483,486 B2
(45) Date of Patent: Jan. 27, 2009

(54) METHOD AND APPARATUS FOR ENCODING HIGH DYNAMIC RANGE VIDEO

(75) Inventors: Rafal Mantiuk, Saabrücken (DE);
Grzegorz Krawczyk, Saabrücken (DE);
Karol Myszkowski, Saabrücken (DE);
Hans-Peter Seidel, St. Ingbert (DE)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 698 days.

(21) Appl. No.: 10/884,178

(22) Filed: Jul. 2, 2004

(65) Prior Publication Data

US 2006/0002611 A1 Jan. 5, 2006

(51) Int. Cl.
*H04B 1/66* (2006.01)
*G06K 9/36* (2006.01)

(52) U.S. Cl. .............. 375/240.03; 375/240.01; 375/240.23; 382/239

(58) Field of Classification Search ......... 382/164–166, 382/190, 193, 194, 199, 225, 266, 274, 287, 382/239; 375/240.01, 240.23
See application file for complete search history.

(56) References Cited

U.S. PATENT DOCUMENTS

| | | | |
|---|---|---|---|
| 4,745,473 A * | 5/1988 | Hall | 348/396.1 |
| 6,018,600 A * | 1/2000 | Levin et al. | 382/284 |
| 6,118,820 A * | 9/2000 | Reitmeier et al. | 375/240.16 |
| 6,366,705 B1 * | 4/2002 | Chiu et al. | 382/239 |
| 6,542,259 B1 * | 4/2003 | Andersen et al. | 358/1.9 |
| 6,845,180 B2 * | 1/2005 | Matthews | 382/268 |

OTHER PUBLICATIONS

Furukawa et al., "Required Quantizing Resolution for Perceptually Linearized Medical X-Ray Images on Display Monitor", 2003.*
Shao et al., "Pixel-Feature-Controlling Edge Detection Based on Regularization (PEDBOR)", 1993.*
Kim et al., "Automatic Edge Detection Using 3×3 Ideal Binary Pixel Patterns and Fuzzy-based Edge Thresholding", 2003.*

(Continued)

*Primary Examiner*—Vikkram Bali
*Assistant Examiner*—Soo Jin Park
(74) *Attorney, Agent, or Firm*—Ballard Spahr Andrews & Ingersoll, LLP

(57) ABSTRACT

A method and apparatus for encoding high dynamic range video by means of video compression is shown. The method comprises the steps of providing high dynamic range (HDR) tristimulus color data (XYZ) for each frame of the video and threshold versus intensity data for a human observer; constructing a perceptually conservative luminance transformation from continuous luminance data (Y) to discrete values ($L_p$) using said threshold versus intensity data for the human observer; transforming the HDR tristimulus color data into perceptually linear color data of three color channels ($L_p$, u', v') for obtaining visually lossless compressed frames; estimating motion vector of said consecutive frames of the video and compensating the difference of the tristimulus color data for performing an inter-frame encoding and an inter-frame compression; transforming the compensated differences of the tristimulus color data to frequency space data; quantizing said frequency space data; variable-length encoding of the quantized frequency space data and storing or transmitting a stream of visual data resulting from the encoded quantized frequency space data.

16 Claims, 3 Drawing Sheets

OTHER PUBLICATIONS

Tscheblockov et al., "NVIDIA GeForce 6800 Ultra and GeForce 6800: NV40 Enters the Scene (p. 7)", Apr. 2004.*

Kang et al. "High Dynamic Range Video," ACM Transactions on Graphics 22(3):319-325 (2003).

Ashikhmin, "A Tone Mapping algorithm for high contrast images" Eurographics Workshop on Rendering (2002) pp. 1-11.

Kainz et al. "The OpenEXr Image file format" Industrial Light & Magic.

"Digital Imaging and Communications in Medicaine (DICOM) Part 13: Grayscale Standard display function" National Electrical Manufacturers Association, Rosslyn, Virginis, 2003.

* cited by examiner

METHOD AND APPARATUS FOR ENCODING HIGH DYNAMIC RANGE VIDEO

The invention relates to high dynamic range (HDR) video encoding in general, and more particularly, the invention relates to a method and apparatus for encoding high dynamic range video by means of video compression.

BACKGROUND OF THE DISCLOSURE

Conventional display devices basing on LCD and CRT technology can display images with maximum luminance contrast of 1:400, while the human eye can capture luminance ranging from $10^{-4}$ to $10^8$ cd/m$^2$ through mechanisms of visual adaptation. High luminance contrast enhances quality of the video and is necessary to achieve realistic appearance of a reproduced scene. Since display devices capable of showing images with a contrast of 1:10$^5$ are becoming available, there is a need for an efficient storage and transmission of large amounts of visual information contained in high dynamic range (HDR) video.

Today's state of the art technology enables acquisition and presentation of high-dynamic range images and video. However, to utilize a complete HDR pipeline from acquisition to display, efforts are made to reach efficient storage and transmission of HDR video. Existing image compression methods and apparatus allow for storage of the video that is meant to be displayed only on said conventional display devices (e.g. CRT, LCD), i.e. low dynamic range (LDR) video.

On the acquisition side, several HDR video cameras have become available on the market in recent years: Autobrite from SMal Camera Technologies, HDRC from IMS Chips, LM9628 from National, and Digital Pixel System from Pixim. The HDR range video can also be captured using inexpensive, traditional low dynamic range (LDR) cameras. In Kang et al., 2003, "High Dynamic Range Video", ACM Transactions on Graphics, volume 22, number 3, pages 319-325 it is shown that registered video frames, which are captured with quickly changing exposures, can be fused into HDR frames. Also, sensors used in surveillance, remote sensing, space research, and medical applications (e.g. CT scanning) produce HDR images and video. Another source of HDR video are computer simulations, common in the global illumination computation and scientific visualization.

Recently, HDR display devices have become available as well. Those enable direct displaying of HDR video with luminance ranges of 0.01-10,000 cd/m$^2$. However, what is even more important, traditional LDR display devices can benefit from HDR video streams as well. HDR video contains complete information that the human eye can register and the so-called tone mapping techniques can use this information for displaying video in an optimal way by taking into account the state of HVS adaptation. This way the video reproduction can be dynamically adapted to any external lighting conditions and customized for any type of a display device (projector, plasma, CRT, LCD) and its unique characteristics. Such customization is not possible by the means of current LDR video technology because of missing luminance information, which leads to unnecessary lower visual quality of video reproduction.

Since the number of applications utilizing HDR technology is rapidly increasing and steady progress in the development of HDR capable capture and display devices is observed, there is a need for an efficient storage and transmission of large amounts of visual information contained in HDR video. The efficient storage and transmission of such HDR data is crucial for the completeness of any HDR imaging pipeline. Existing image compression methods and apparatus allow for storage of the LDR video, with limited information that is optimized to be displayed on only typical display devices.

An important problem is the HDR image encoding which usually relies on the luminance and color gamut quantization for storage and transmission efficiency. Some successful attempts have been made to develop compression methods for static HDR images. Bogart et. al. "OpenEXR image file format", ACM Siggraph 2003, Sketches & Applications show the successful encoding for still HDR images, but no efficient inter-frame encoding of HDR video.

Therefore it is seen to be desirable to provide a method and apparatus for encoding HDR video, which are capable to reproduce the appearance of images as perceived by a human observer in the real world by providing an efficient storage and transmission method of large amounts of visual information contained in HDR video.

SUMMARY OF THE INVENTION

The invention comprises a method for encoding HDR video with the steps of:
providing high dynamic range (HDR) tristimulus color data (XYZ) for each frame of the video and threshold versus intensity data for a human observer;
constructing a perceptually conservative luminance transformation from continuous luminance data (Y) to discrete values ($L_p$) using said threshold versus intensity data for the human observer;
transforming the HDR tristimulus color data into perceptually linear color data of three color channels ($L_p$, u', v') for obtaining visually lossless compressed frames;
estimating motion vector of said consecutive frames of the video and compensating the difference of the tristimulus color data for performing an inter-frame encoding and an inter-frame compression;
transforming the compensated differences of the tristimulus color data to frequency space data;
quantizing said frequency space data;
variable-length encoding of the quantized frequency space data and
storing or transmitting a stream of visual data resulting from the encoded quantized frequency space data.

An apparatus for encoding high dynamic range video by means of video compression comprises:
a receiving unit, coupled to receive high dynamic range (HDR) tristimulus color data for each frame of the video and predetermined threshold versus intensity data for a human observer;
a converting unit, coupled to the receiving unit, for constructing a perceptually conservative luminance transformation from continuous luminance data (Y) to discrete values ($L_p$) using said threshold versus intensity data for the human observer;
a first transforming unit, coupled to the converting unit, for transforming the HDR tristimulus color data into perceptually linear color data of three color channels ($L_p$; u', v') for obtaining visually lossless compressed frames;
a first compression encoder, coupled to the first transforming unit, for estimating motion vector of the consecutive frames of the video and for compensating the difference of the tristimulus color data for performing an inter-frame encoding and an inter-frame compression;
a second transforming unit, coupled to the first compression encoder, for transforming the compensated differences of the tristimulus color data to frequency space data;

a quantizing unit, coupled to the second transforming unit, for quantizing the frequency space data;

an encoder, coupled to the quantizing unit, for the variable-length encoding of the quantized frequency space data, and a storing or transmission unit, coupled to the encoder, for storing or transmitting a stream of visual data resulting from the encoded quantized frequency space data.

By means of this method and apparatus complete calorimetric information can be played back without loss of visual quality on any advanced display device, capable of displaying an extended luminance range and color gamut. While existing compression methods can store video that can be displayed with optimum quality only on particular display devices, the inventive method is capable to compress video data which can be displayed on any device with the quality that is limited only by the human perception. Furthermore, the inventive method can use MPEG-like encoding processes and thus making it susceptible of hardware implementation.

According to an embodiment of the method said step of constructing perceptually conservative transformation utilizes a characteristic of a measuring or data acquisition device instead of the threshold versus intensity data for the human observer to obtain conservative quantization distortions according to the said characteristic of the measuring or data acquisition device.

The step of transforming the compensated differences can comprise according to another embodiment the steps of:

dividing compensated differences of the luminance data ($L_p$) that includes at least one predetermined sharp edge into luminance data including exclusively a signal with slowly changing values and luminance data including exclusively a signal with the at least one sharp edge;

transforming the luminance data including a signal with slowly changing values to further frequency space data;

encoding of the luminance data including exclusively the signal with the at least one sharp edge.

In addition the step of dividing compensated differences of the luminance data can comprise the step of selecting luminance data of the compensated differences of the luminance data including the predetermined sharp edge, in which the sharp edge exceed a predetermined threshold contrast value, wherein the threshold contrast value is allocated a predetermined luminance contrast between neighboring pixels of the video.

The luminance contrast between the neighboring pixels is the minimum luminance difference that introduces visible artifacts due to quantization of frequency components.

The step of encoding of the luminance data utilizes run-length encoding of the luminance data including exclusively the signal with the at least one sharp edge.

According to one embodiment of the apparatus the apparatus further includes:

a dividing unit for dividing compensated differences of the luminance data that includes at least one predetermined sharp edge into luminance data including exclusively a signal with slowly changing values and luminance data including exclusively a signal with the at least one sharp edge;

a third transforming unit for transforming the luminance data including a signal with the slowly changing values to further frequency space data, and a second compression encoder for encoding the luminance data including exclusively the signal with the at least one sharp edge.

BRIEF DESCRIPTION OF THE DRAWING

The teaching of the present invention can be readily understood by considering the following detailed description in conjunction with the accompanying figures, in which.

DETAILED DESCRIPTION

Figure 1:
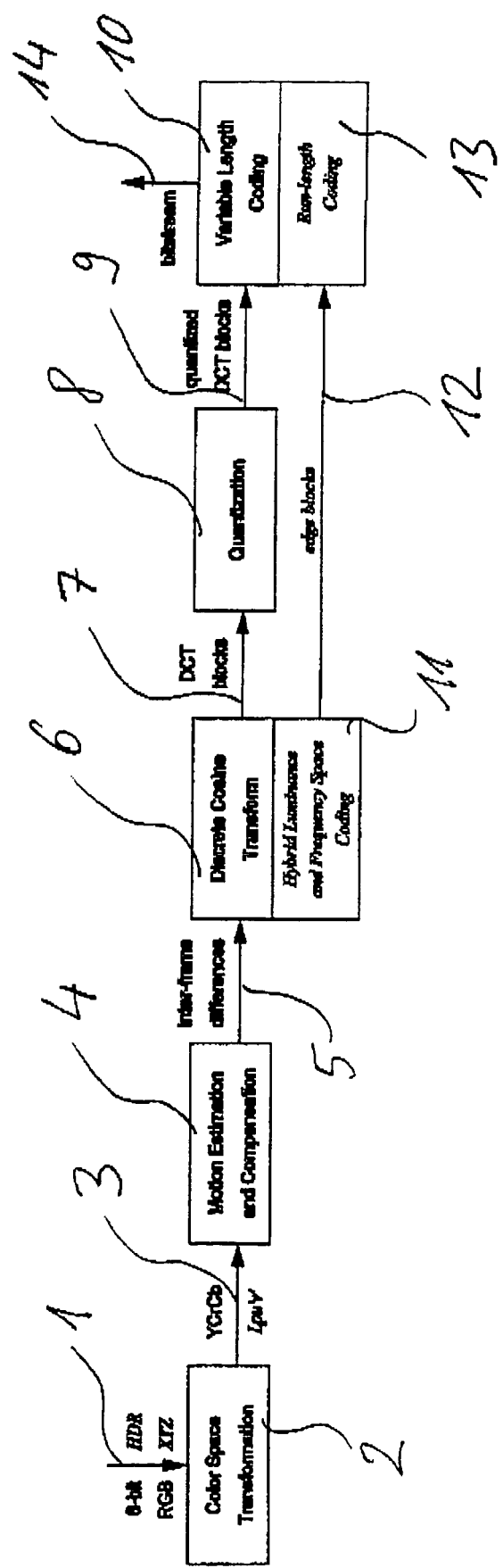
FIG. 1 depicts a flow diagram of the inventive encoding method.

FIG. 1 shows a flow diagram of the inventive encoding method. HDR XYZ tristimulus color data 1 of a video are inputted into an inventive apparatus for encoding HDR video. Such HDR XYZ tristimulus color data can represent the full color gamut and the complete range of luminance the eye of a human being can adapt to.

The color data is transformed and stored as color information by using a perceptually linear $L_p$u'v' color space (steps 2 and 3). The $L_p$u'v' color space offers good compression performance and can represent the complete color gamut and range of luminance visible for the human eye. The u'v' components are found using the standard XYZ to u'v' conversion and the $L_p$ component is found by a perceptually conservative quantization of Y, described in the next paragraphs.

In step 4 an inter-frame compression is performed by estimating and compensating motion data of different frames. Such inter-frame compression results in significant savings in bit-stream size and can be easily adapted to HDR data.

In the steps 5 and 6 inter-frame differences are transformed to a frequency space by a Discrete Cosine Transform (DCT). Such frequency space offers a more compact representation of video and allows perceptual processing.

In the steps 7 and 8 created DCT coefficients blocks are quantized. After these steps the quantized coefficient blocks 9 are variable length encoded (step 10).

Due to the quantization of DCT coefficients, noisy artifacts may appear near edges of high contrast objects. To alleviate this problem a hybrid frequency and luminance space encoding according to the steps 11, 12 and 13 is performed, where sharp edges are encoded separately from smoothed DCT data.

Real-world luminance values are mapped to a finite number of integers ($L_p$) using a perceptually conservative function, which is constructed a follows:

It is known that the HVS sensitivity depends strongly on the adaptation luminance level regarding the background. The sensitivity is measured as the just noticeable luminance threshold $\Delta y$ that can be distinguished on the uniform background luminance y.

The threshold versus intensity is: $tvi(y)=\Delta y$.

The similar contrast versus intensity is: $cvi(y)=\Delta y/y$.

For finding a luminance (Y) to integers ($L_p$) mapping function $l=\Psi^{-1}(y)$, in which the quantization error is always lower than the threshold of perceivable luminance $\Delta y$, the following formula can be used:

$$d\Psi(l)/dl = 2 \cdot f^{-1} \cdot tvi(\Psi(l)) \qquad (1)$$

where $d\Psi(l)/dl$ is a derivative of the function $\Psi(l)$. Boundary conditions for the above differential equation are given by the minimum and maximum visible luminance: $\Psi(0)=10^{-4}$ cd/m$^2$ and $\Psi(l_{max})=10^8$ cd/m$^2$, where $l_{max}=2^{nbits}-1$ is the maximum integer value.

The variable f indicates how much lower than the tvi( ) function the maximum quantization errors are, or how conservative the mapping is. This gives a trade-off between the number of bits and the quality of the luminance mapping. The variable f should have the value equal 1 to achieve near the threshold quantization distortions and greater than 1 to achieve distortions below the threshold. The numerical solution of Formula (1) gives a function $\Psi$, which converts from $L_p$ values to luminance Y (used for decoding). The inverse function $\Psi^{-1}$ and rounding to the nearest integer (uniform quantization) should be used for encoding. Depending on the threshold versus intensity (tvi) data, 10-12 bits are usually required to store $L_p$ values.

The above quantization depends on a HVS response to contrast at different illumination levels. However, the loss of information in the human eye is limited not only by the thresholds of luminance contrast but also by the spatial configuration of image patterns. To take full advantage of those HVS characteristics, MPEG encoders apply the DCT to each 8×8 pixel block of an image. Then each DCT frequency coefficient is quantized separately with the precision that depends on the spatial frequency it represents. As the human eye is less sensitive to high frequencies, larger loss of information for high frequency coefficients is allowed. Following it is shown that the MPEG-4 quantization strategy for frequency coefficients can be applied to HDR data.

In MPEG encoders, the quantization of frequency coefficients is determined by a quantization scale $q_{scale}$ and a weighting matrix W. Frequency coefficients E are changed into quantized coefficients Ê using the formula $$\hat{E}_{ij}=[E_{i,j}/(W_{i,j} \cdot q_{scale})] \text{ where } i,j=1 \ldots 8 \qquad (2)$$

The brackets denote rounding to the nearest integer and i, j are indices of the DCT frequency band coefficients. The weighting matrix W usually remains unchanged for whole video or a group of frames, and only the coefficient $q_{scale}$ is used to control quality and bit-rate. Note that the above quantization can introduce noise in the signal that is less than half of the denominator $W_{i,j} \cdot q_{scale}$.

Both the HDR perceptually quantized space $L_p$ and the gamma corrected $YC_BC_R$ space of LDR pixel values are approximately perceptually uniform. In other words, the same amount of noise results in the same visible artifacts regardless of the background luminance.

If quantization adds noise to the signal that is less than half of the denominator of the above equation 2, quantizing frequency coefficients using the same weighting matrix W in both spaces introduces artifacts, which differ between those spaces by a roughly constant factor. Therefore to achieve the same visibility of noise in the HDR space as in LDR space, the weighting matrix W should be multiplied by a constant value. This can be achieved by setting a proper value of the coefficient $q_{scale}$.

The default weighting matrices currently used in MPEG-4 for quantization are tuned for typical CRT/LCD display conditions and luminance adaptation levels around 30-100 cd/m². Contrast sensitivity studies demonstrate that the HVS is the most sensitive in such conditions and the corresponding threshold values essentially remain unchanged across all higher luminance adaptation values. On the other hand, the threshold values significantly increase for the lower luminance adaption levels. This means that MPEG-4 weighting matrices are conservative for HDR data.

Figure 2:
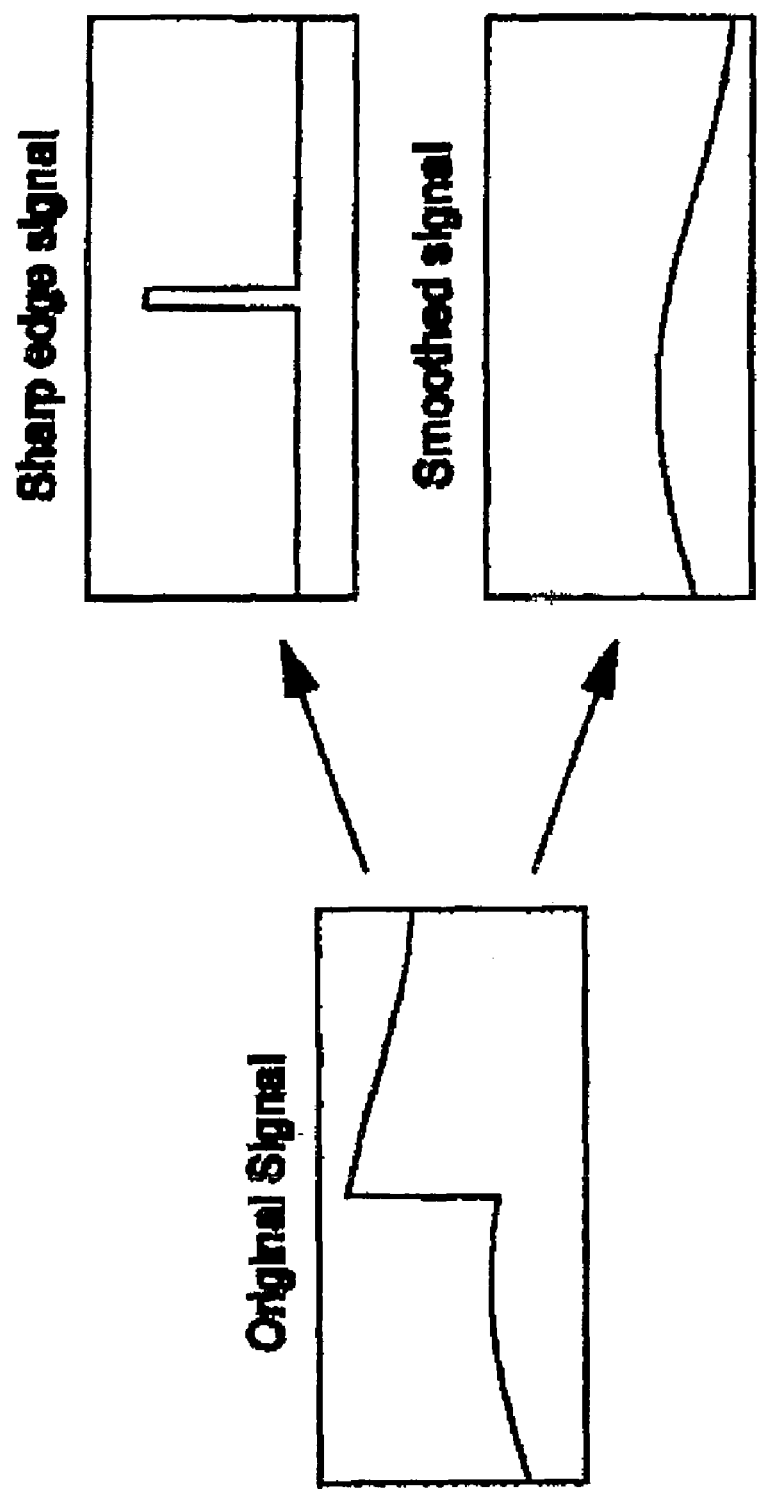
FIG. 2 shows a decomposition of a signal into sharp edge and smoothed signals.

According to one embodiment of the method, the step of transforming the compensated differences involves a decomposition of a signal into a sharp edge signal and a smoothed signal as shown in FIG. 2). HDR images can contain sharp transitions from low to extremely high luminance values, for example at the edges of light sources. Information about sharp edges is encoded into high frequency DCT coefficients, which are coarsely quantized. This results, according to the state of art, in visible noisy artifacts around edges. Therefore the following inventive hybrid encoding stores separately low-frequency data in DCT blocks and sharp edges in the edge blocks. FIG. 2 illustrates how, in case of 1 D data, input luminance that contains a sharp edge can be split into two signals: one piece-wise constant that contains the sharp edge alone and another that holds slowly changing values. The original signal can be reconstructed from those two signals. Because sharp edges occur in sequences relatively infrequently, the signal that stores them can be effectively encoded. The second signal no longer contains large values of high frequency coefficients and can be transformed into a compact DCT representation.

Figure 3:
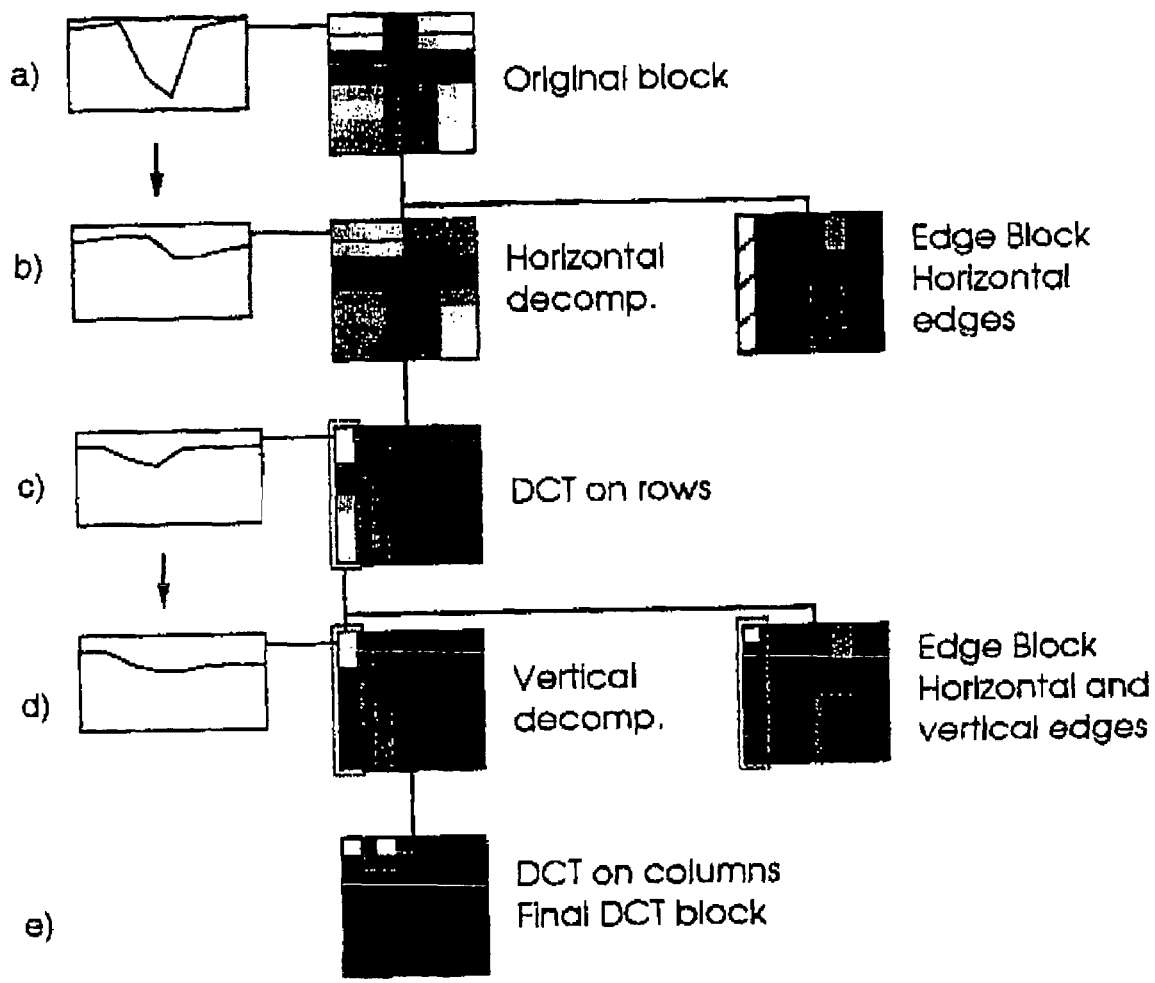
FIG. 3 shows a process of hybrid encoding of a single 8×8 block.

A process of hybrid encoding of a single 8×8 block is shown in FIG. 3. To isolate sharp edges from the rows of this block, we use a simple local criterion: If two consecutive pixels in a row differ by more than a certain threshold, they are considered to form an edge. In such case the difference between those pixels is subtracted from all pixels in the row, starting from the second pixel of that pair up to the right border of the block. The difference itself is stored in the edge block at the position of the second pixel of that pair. The algorithm is repeated for all 8 rows of the block. This step is shown in FIG. 3b. After the rows have been smoothed, they can be transformed to DCT space (FIG. 3c). Due to the fact that the smoothed and transformed rows contain large values only for the DC frequency coefficients, only the first column containing those coefficients has to be smoothed in order to eliminate sharp edges along the vertical direction. We process that column in the same way as the rows and place resulting "edges" in the first column of the edge block (FIG. 3d). Finally, we can apply a vertical DCT (FIG. 3e). Since each edge block is compressed using a run-length encoding, which uses a high bit-rate, only the edges that are the source of visible artifacts should be encoded separately in edge blocks. The threshold contrast value that an edge must exceed to cause visible artifacts depends on the maximum error of the quantization and can be estimated.

Table 1 shows threshold contrast values of a sharp edge above which artifacts caused by DCT quantization can be seen.

TABLE 1

| | $q_{scale}$ | | | | |
|---|---|---|---|---|---|
| | 1-5 | 6 | 7 | 8 | 9-31 |
| Threshold inter | n/a | 936 | 794 | 531 | 186 |
| Threshold intra | n/a | n/a | 919 | 531 | 186 |

The values can be used to decide whether a sharp edge should be coded in a separate edge block. The thresholds are given for different compression quality factors $q_{scale}$ and for both intra- and inter-encoded frames. It is to note that for $q_{scale} \leq 5$ noisy artifacts are not visible and no hybrid encoding is necessary.

Although various embodiments that incorporate the teachings of the presented invention have been shown and described in detail herein, those skilled in the art can readily devise many other varied embodiments that still incorporate these teachings.

What is claimed is:

1. A method for encoding high dynamic range video by means of video compression comprising the steps:

(a) providing high dynamic range (HDR) tristimulus color data (XYZ) for each frame of the video and threshold versus intensity data for a human observer;

(b) constructing a perceptually conservative luminance transformation from continuous luminance data (Y) to discrete values ($L_p$) using said threshold versus intensity data for the human observer, the luminance transformation ($l=\Psi^{-1}(y)$) being constructed such that a quantization error is always lower than a threshold ($\Delta y$) of perceivable luminance, wherein the luminance transformation ($l=\Psi^{-1}(y)$) is constructed using the formula $d\Psi(l)/dl=2*f^{-1}*tvi(\Psi(l))$, where $d\Psi/dl$ is a derivative of a luminance function $\Psi(l)$ and f is a variable indicating how much lower than a threshold versus intensity function (tvi( )) for a particular luminance level maximum quantization errors are;

(c) by using the luminance transformation constructed in step (b), transforming the HDR tristimulus color data into perceptually linear color data of three color channels ($L_p$, u', v') for obtaining visually lossless compressed frames;

(d) estimating motion vector of said consecutive frames of the video and compensating differences of the tristimulus color data for performing an inter-frame encoding and an inter-frame compression;

(e) transforming the compensated differences of the tristimulus color data to frequency space data;

(f) quantizing said frequency space data;

(g) variable-length encoding of the quantized frequency space data; and (h) storing or transmitting a stream of visual data resulting from the encoded quantized frequency space data.

2. The encoding method of claim 1, wherein said step of constructing perceptually conservative transformation utilizes a characteristic of a measuring or data acquisition device instead of the threshold versus intensity data for the human observer to obtain conservative quantization distortion according to the said characteristic of the measuring or data acquisition device.

3. The encoding method of claim 1, wherein said step of transforming the compensated differences comprises the steps of: dividing compensated differences of the luminance data ($L_p$) that includes at least one predetermined sharp edge into luminance data including exclusively a signal with slowly changing values and luminance data including exclusively a signal with the at least one sharp edge; transforming the luminance data including a signal with slowly changing values to frequency space data; encoding of the luminance data including exclusively the signal with the at least one sharp edge.

4. The encoding method of claim 3, wherein said step of dividing compensated differences of the luminance data comprises the step of: selecting luminance data of the compensated differences of the luminance data including the predetermined sharp edge, in which the sharp edge exceed a predetermined threshold contrast value, wherein the threshold contrast value is a predetermined luminance contrast between neighboring pixels of the video.

5. The encoding method of claim 4, wherein the luminance contrast between the neighboring pixels is a minimum luminance difference that introduces visible artifacts due to quantization of frequency components.

6. The encoding method of claim 3, wherein said step of encoding of the luminance data utilizes run-length encoding of the luminance data including exclusively the signal with the at least one sharp edge.

7. The encoding method of claim 1, wherein in step (b) the luminance transformation ($l=\Psi^{-1}(y)$) is constructed in a boundary condition range given by a minimum luminance $\Psi(0)=10^{-4}$ cd/m$^2$ and a maximum visible luminance $\Psi(l_{max})=10^8$ cd/m$^2$, where $l_{max}=2^{nbits}-1$ is a maximum integer value.

8. The encoding method of claim 1, wherein the variable f has a value equal to 1 to achieve near the threshold ($\Delta y$) quantization distortions or greater than 1 to achieve distortions below the threshold.

9. Apparatus for encoding high dynamic range video by means of video compression comprising:

a receiving unit, coupled to receive high dynamic range (HDR) tristimulus color data for each frame of the video and predetermined threshold versus intensity data for a human observer;

a converting unit, coupled to the receiving unit, for constructing a perceptually conservative luminance transformation from continuous luminance data (Y) to discrete values ($L_p$) using said threshold versus intensity data for the human observer, where the luminance transformation ($l=\Psi^{-1}(y)$) is constructed such that a quantization error is always lower than a threshold ($\Delta y$) of perceivable luminance, wherein the converting unit is for constructing the luminance transformation ($l=\Psi^{-1}(y)$) using the formula $d\Psi(l)/dl=2 *f^{-1}tvi(\Psi(l))$, where $d\Psi/dl$ is a derivative of a luminance function $\Psi(l)$ and f is a variable indicating how much lower than a threshold versus intensity function (tvi( )) for a particular luminance level maximum quantization errors are;

a first transforming unit, coupled to the converting unit, for transforming by using the luminance transformation constructed by the converting unit, the HDR tristimulus color data into perceptually linear color data of three color channels ($L_p$, u', v') for obtaining visually lossless compressed frames;

a first compression encoder, coupled to the first transforming unit, for estimating motion vector of the consecutive frames of the video and for compensating differences of the tristimulus color data for performing an inter-frame encoding and an inter-frame compression;

a second transforming unit, coupled to the first compression encoder, for transforming the compensated differences of the tristimulus color data to frequency space data;

a quantizing unit, coupled to the second transforming unit, for quantizing the frequency space data;

an encoder, coupled to the quantizing unit, for variable-length encoding of the quantized frequency space data; and a storing or transmission unit, coupled to the encoder, for storing or transmitting a stream of visual data resulting from the encoded quantized frequency space data.

10. The apparatus of claim 9, wherein the seconded transforming unit is coupled with a dividing unit for dividing compensated differences of the luminance data that includes at least one predetermined sharp edge into luminance data including exclusively a signal with slowly changing values and luminance data including exclusively a signal with the at least one sharp edge; a third transforming unit for transforming the luminance data including a signal with the slowly changing values to further frequency space data, and a second compression encoder for encoding the luminance data including exclusively the signal with the at least one sharp edge.

11. The apparatus of claim 10, wherein the second compression encoder is coupled with: a third compression encoder for a run-length encoding of the luminance data including exclusively the signal with the at least one sharp edge.

12. The apparatus of claim 11, wherein the dividing unit is coupled with:
a selecting unit for selecting luminance data of the compensated differences of the luminance data including the predetermined sharp edge, in which the sharp edge exceed a predetermined threshold contrast value, wherein the threshold contrast value is allocated a predetermined luminance contrast between neighboring pixels of the video.

13. The apparatus of claim 10, wherein the dividing unit is coupled with:
a selecting unit for selecting luminance data of the compensated differences of the luminance data including the predetermined sharp edge, in which the sharp edge exceed a predetermined threshold contrast value, wherein the threshold contrast value is allocated a predetermined luminance contrast between neighboring pixels of the video.

14. The apparatus of claim 9, wherein the converting unit is constructing the luminance transformation ($l=\Psi^{-1}(y)$) in a boundary condition range given by a minimum luminance $\Psi(0)=10^{-4}$ cd/m$^2$ and a maximum visible luminance $\Psi(l_{max})=10^8$ cd/m$^2$, where $l_{max}=2^{nbits}-1$ is a maximum integer value.

15. The encoding method of claim 14, wherein the variable f has a value equal to 1 to achieve near the threshold ($\Delta y$) quantization distortions or greater than 1 to achieve distortions below the threshold.

16. The encoding method of claim 9, wherein the variable f has a value equal to 1 to achieve near the threshold ($\Delta y$) quantization distortions or greater than 1 to achieve distortions below the threshold.

\* \* \* \* \*